United States Patent [19]
Yeh

[11] Patent Number: 6,152,018
[45] Date of Patent: Nov. 28, 2000

[54] SUPPORT FOR TEA MAKING DEVICE

[76] Inventor: Chuan Jang Yeh, No. 87, Bei Mei, Rd. Ho Mei Town, Chang Hua Hsien 508, Taiwan

[21] Appl. No.: 09/413,178

[22] Filed: Oct. 7, 1999

[51] Int. Cl.[7] .............................. A47J 31/00; B65D 25/24; B65D 90/12
[52] U.S. Cl. ............................ 99/279; 99/323.3; 99/297; 99/287; 220/636; 220/634; 220/632
[58] Field of Search .............................. 99/287, 297, 279, 99/275, 299, 323.3; 220/632, 634, 636

[56] References Cited

U.S. PATENT DOCUMENTS 3,419,240  12/1968  Santic ........................................ 220/632
4,401,014  8/1983  McGrail et al. ........................ 99/287 X
5,570,623  11/1996  Lin ......................................... 99/297 X
5,635,233  6/1997  Levinson ............................... 99/297 X

*Primary Examiner*—Reginald L. Alexander
*Attorney, Agent, or Firm*—Charles E. Baxley

[57] ABSTRACT

A tea making device includes a bottle for receiving and making tea, a base having an open top for receiving the bottle and having a downward extending peripheral wall. A pad has a peripheral groove for receiving the peripheral wall of the base. The peripheral wall of the base includes a size greater than the bottle for stably supporting the bottle in place. A seat is secured between the bottle and the base and has one or more ribs engaged with the bottle and has a latch device for securing the seat to the base.

6 Claims, 4 Drawing Sheets

SUPPORT FOR TEA MAKING DEVICE

BACKGROUND OF THE INVENTION

1. Field of the Invention

The present invention relates to a support, and more particularly to a support for a tea making device.

2. Description of the Prior Art

Typical tea making devices comprise a bottle having a base of metal materials which may scrape and. damage the table surface and which may slip relative to the table surface.

The present invention has arisen to mitigate and/or obviate the afore-described disadvantages of the conventional tea making devices.

SUMMARY OF THE INVENTION

The primary objective of the present invention is to provide a tea making device having an anti-slip support.

In accordance with one aspect of the invention, there is provided a tea making device comprising a bottle for receiving and making tea, the bottle including a bottom portion, a base including an open top for receiving the bottom portion of the bottle and a peripheral wall extended downward therefrom, and a pad including a peripheral groove formed therein for receiving the peripheral wall of the base.

The pad includes an outer flange and an inner flange formed thereon for defining the peripheral groove between the flanges. The outer flange of the pad includes a size greater than that of the inner flange for preventing the base from being disengaged from the pad. The peripheral wall of the base includes a size greater than that of the bottle for stably supporting the bottle in place.

A seat is secured between the bottom portion of the bottle and the base and includes at least one rib extended therefrom for engaging with the bottle and for detachably securing the bottle in the seat. The seat includes a latch device engaged with the base for securing the seat to the base. The base includes an opening formed therein, the latch device of the seat is engaged through the opening of the base and engaged with the base for securing the seat to the base.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
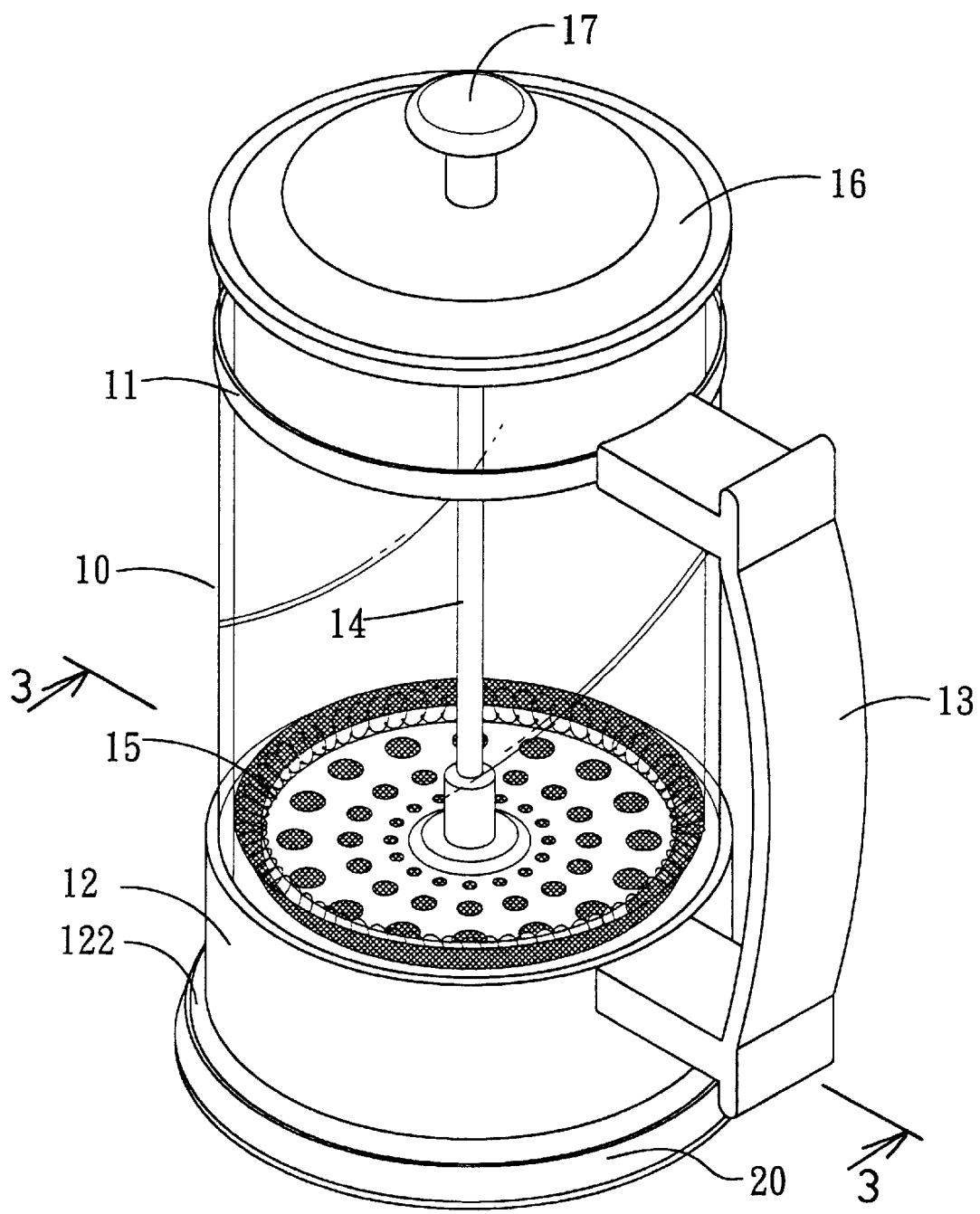
FIG. 1 is a perspective view of a tea making device in accordance with the present invention.
Figure 2:
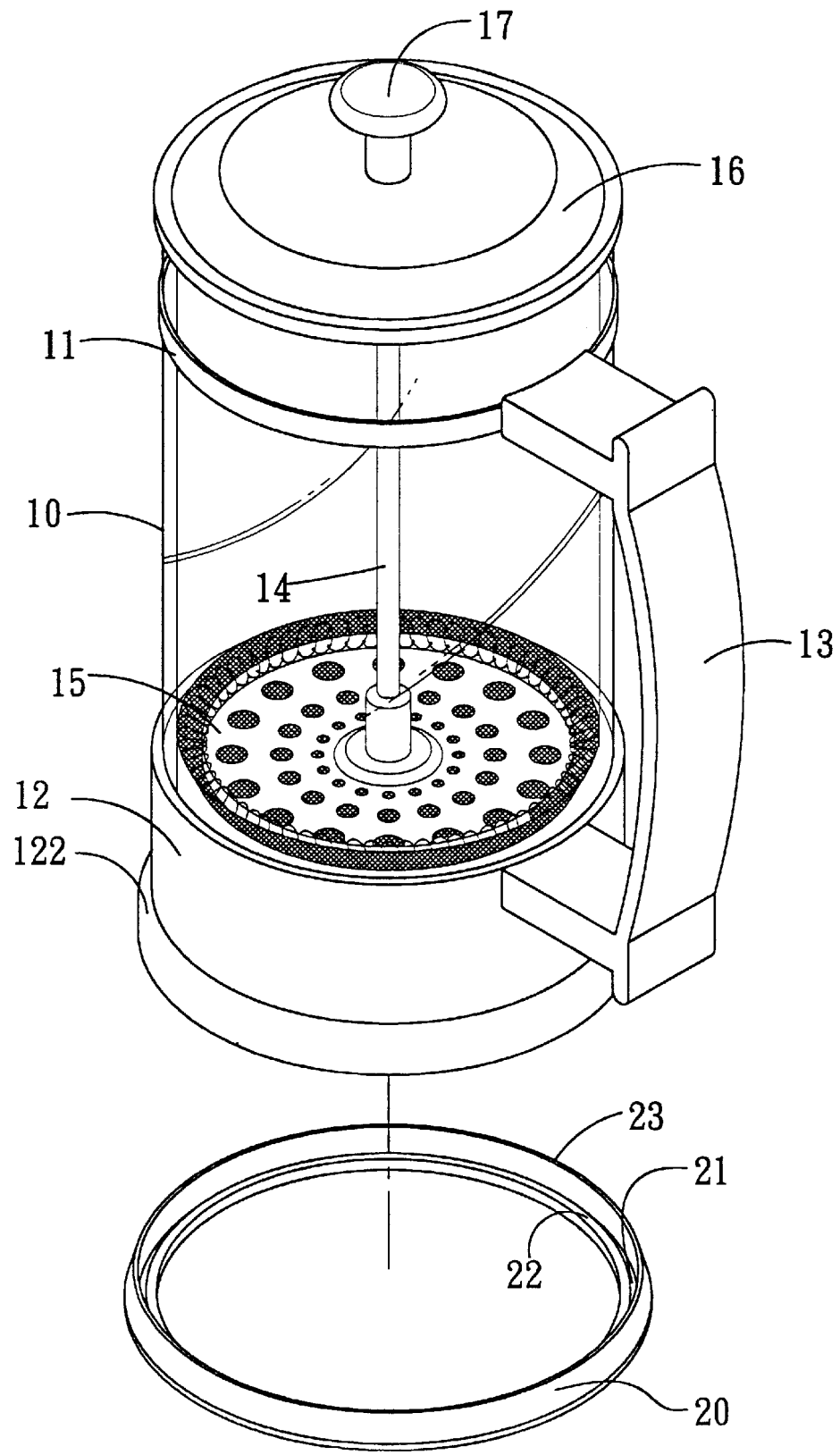
FIG. 2 is a partial exploded view of the tea making device.
Figure 3:
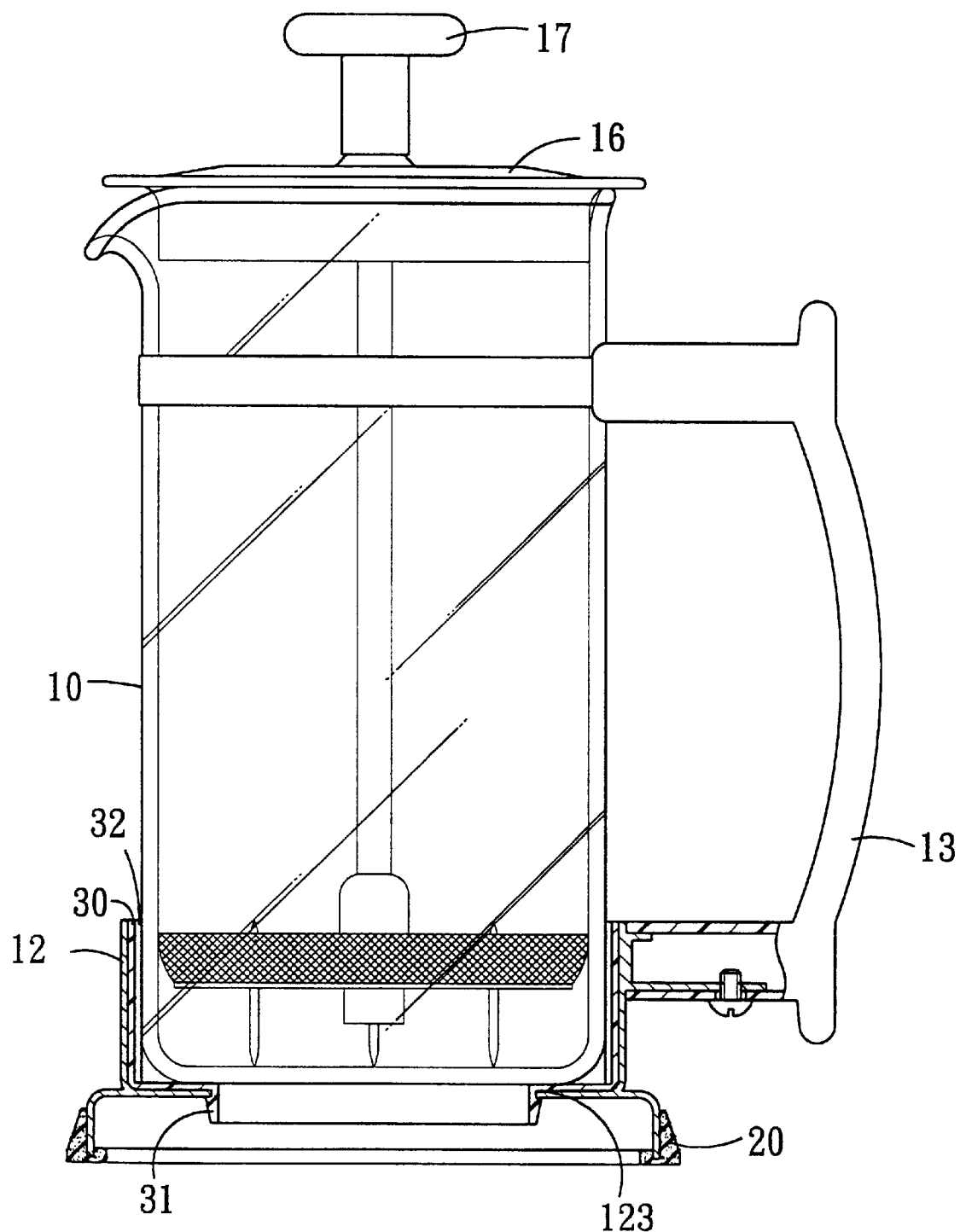
FIG. 3 is a partial cross sectional view taken along lines 3—3 of FIG. 1.

Referring to the drawings, and initially to FIGS. 1–3, a tea making device in accordance with the present invention comprises a bottle 10 preferably of glass. materials for receiving and making tea therein. A rim 11 is engaged on top of the bottle 10. A base 12 includes an open top for receiving the bottom portion of the bottle 10 therein and includes a peripheral wall. 122 extended downward therefrom which preferably includes a size greater than the bottle 10 for stably supporting the bottle 10 in place. A handle 13 is secured between the rim 11 and the base 12. A cap 16 is engaged on the bottle 10. A screen 15 is slidably received in the bottle 10. A rod 14 has one end secured to the screen 15 and the other end extended upward through the cap 16 and secured to a knob 17 which may be used to move the screen 15 upward and downward in the bottle 10. The rim 11 and/or the base 12 may be made of metal or the other materials. The base 12 includes an opening 123 formed therein (FIG. 3).

Figure 4:
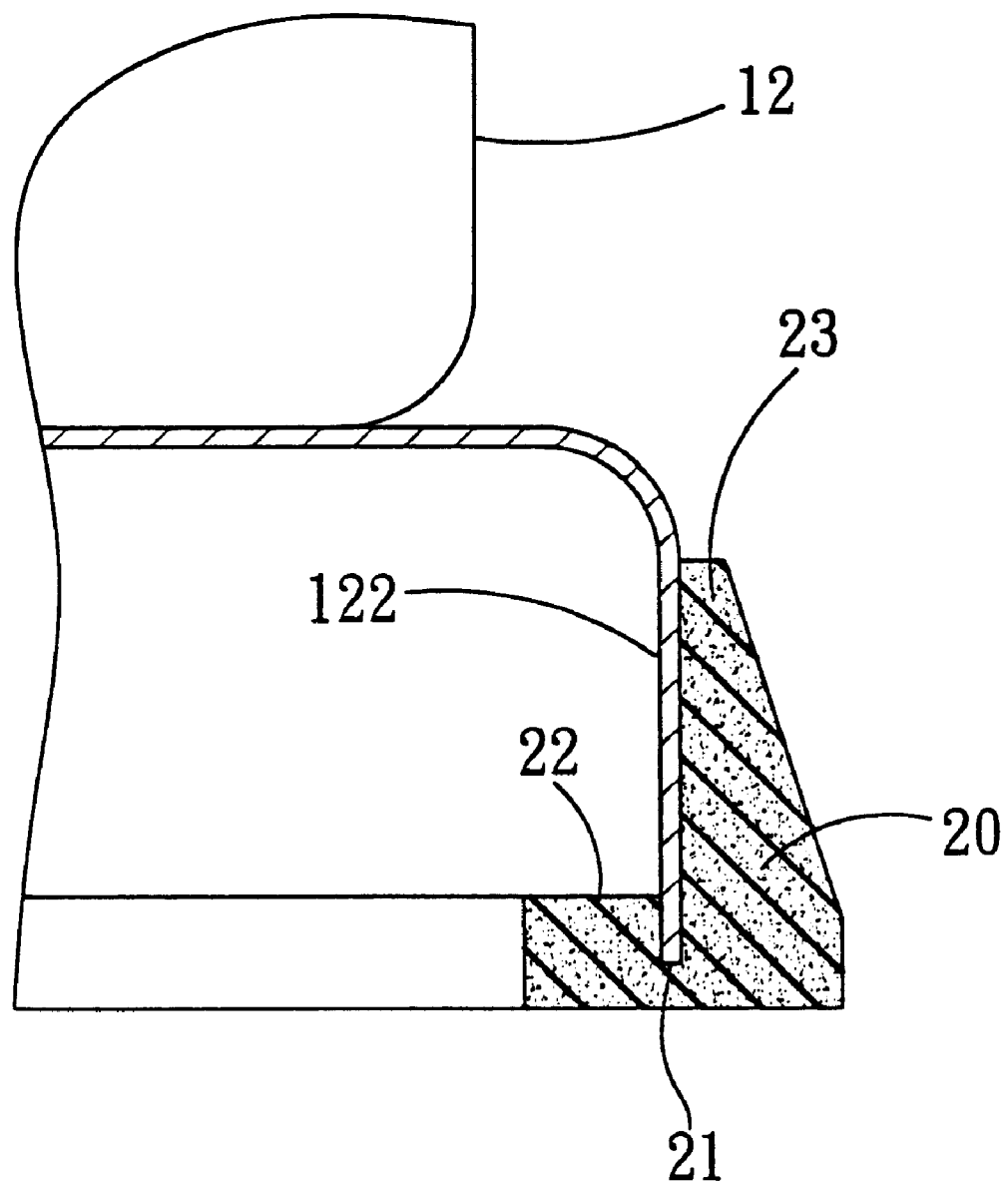
FIG. 4 is an enlarged partial cross sectional view of the tea making device.

A seat 30 is engaged between the bottom portion of the bottle 10 and the base 12 and includes one or more ribs 32 extended radially therefrom for engaging with the bottle 10 and for detachably securing said bottle 10 in the seat 30, and includes one or more hooks or a peripheral latch 31 extended downward therefrom for engaging through the opening 123 of the base 12 and for securing to the base 12. The seat 30 is preferably made of heat resistive materials for preventing the heat from being transmitted to the base 12. A pad 20 includes a peripheral groove 21 formed between an inner flange 22 and an outer flange 23 for receiving the peripheral wall 122 of the base 12 (FIG. 4). The pad 20 is preferably made of plastic or rubber materials for preventing the table surface from being scraped and damaged by the tea making device and for providing an anti-slip effect to the tea making device. The flange 23 includes a size or a height greater than that of the flange 22 for preventing the base 12 from being disengaged from the pad 20.

Accordingly, the tea making device in accordance with the present invention includes an anti-slip structure for stably supporting the tea making device on a table surface and for preventing the tea making device from slipping relative to the table surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tea making device comprising:
   a bottle for receiving and making tea, said bottle including a bottom portion,
   a base including an open top for receiving said bottom portion of said bottle and including a peripheral wall extended downward therefrom,
   a pad including a peripheral groove formed therein for receiving said peripheral wall of said base, and
   a seat secured between said bottom portion of said bottle and said base, said seat including at least one rib extended therefrom for engaging with said bottle and for detachably securing said bottle in said seat.

2. The tea making device according to claim 1, wherein said pad includes an outer flange and an inner flange formed thereon for defining said peripheral groove between said flanges.

3. The tea making device according to claim 2, wherein said outer flange of said pad includes a size greater than that of said inner flange for preventing said base from being disengaged from said pad.

4. The tea making device according to claim 1, wherein said peripheral wall of said base includes a size greater than that of said bottle for stably supporting said bottle in place.

5. A tea making device comprising:

a bottle for receiving and making tea, said bottle including a bottom portion, a base including an open top for receiving said bottom portion of said bottle and including a peripheral wall extended downward therefrom, a pad including a peripheral groove formed therein for receiving said peripheral wall of said base, and a seat secured between said bottom portion of said bottle and said base, said seat including a latch device engaged with said base for securing said seat to said base.

6. The tea making device according to claim 5, wherein said base includes an opening formed therein, said latch device of said seat is engaged through said opening of said base and engaged with said base for securing said seat to said base.

\* \* \* \* \*